INVENTORS
NORMAN G. WILCOX
EDWARD J. RAMALEY
WILLIAM C. CROUCHER

BY Sheridan and Ross
ATTORNEYS

INVENTORS
NORMAN G. WILCOX
EDWARD J. RAMALEY
WILLIAM C. CROUCHER
BY
*Sheridan and Ross*
ATTORNEYS

INVENTORS
NORMAN G. WILCOX
EDWARD J. RAMALEY
WILLIAM C. CROUCHER
BY
Sheridan and Ross
ATTORNEYS

# United States Patent Office 3,449,541
Patented June 10, 1969

3,449,541
APPARATUS FOR PRODUCING RESISTANCE WELDS
Norman G. Wilcox, Littleton, William C. Croucher, Englewood, and Edward J. Ramaley, Denver, Colo., assignors to Martin-Marietta Corporation, New York, N.Y., a corporation of Maryland
Continuation-in-part of application Ser No. 378,902, June 29, 1964. This application Jan. 20, 1966, Ser. No. 521,962
Int. Cl. B23k 11/24
U.S. Cl. 219—108                           15 Claims

ABSTRACT OF THE DISCLOSURE

The apparatus includes a pair of relatively movable electrodes through which a predetermined clamping force is placed on parts positioned therebetween which are to be resistance welded. When the predetermined clamping force is established, a predetermined amount of electrical energy is automatically directed to the electrodes and simultaneously a measuring means is activated. The measuring means measures the "set down" or reduction in thickness of the parts to be welded caused by the welding operation and uses the measured set down to indicate quality of the weld. Electrode movement is measured from the time the electrodes first applies the predetermined pressure on the parts until the same electrode pressure is re-established after the welding has been completed. The measured set down is displayed to the operator and in the event it falls outside of the programmed acceptable quality limits, a circuit is energized which locks the welding apparatus. The welding apparatus can then only be put into operation by a key which unlocks the apparatus.

---

This invention relates generally to welding and more specifically to a resistance welding apparatus incorporating means for rapidly but accurately measuring during the welding operation a reduction in thickness of a plurality of elements to be welded together and utilizing the measurement to control the welding apparatus and to indicate the quality of the weld obtained.

The invention described herein is an improvement of the apparatus described in U.S. patent application Ser. No. 378,902 filed on June 29, 1964 by Edward J. Ramaley and Norman G. Wilcox and is a continuation-in-part of that application.

The invention referred to in patent application Ser. No. 378,902 related to a method and apparatus for making resistance welds in which electrical energy was applied to a plurality of clamped elements until a predetermined reduction in thickness of the clamped elements occurred as a result of localized heating and metal deformation.

The method and apparatus described in the above-mentioned patent application constituted a substantial advance in the state of the art and resulted in the production of resistance welds having an unusual degree of uniform and high quality characteristics. However, it has been found that the apparatus as disclosed therein was subjected to certain disadvantages from a viewpoint of speed of operation and accuracy of measurements. Thus, the present invention is capable of making dynamic measurements whereas the previous invention was capable of making static measurements only. Additionally, since the quality of welds produced is dependent upon the application to each group of parts to be welded together by a uniform clamping force, it became necessary to find a reliable way to apply on an accurate basis substantially the same amount of clamping force to each group of parts to be welded together. It has been found that an unusual degree of accuracy in measurement may be obtained with an apparatus constructed in accordance with the subject invention while at the same time substantially increasing the rate of operation, and a predetermined amount of clamping force may be applied uniformly time after time. More specifically, the foregoing may be accomplished with an apparatus comprising: a pair of electrodes, one of which is mounted for relative movement with respect to the other; a power supply means; signal generating and clamp force applying means, said means including means for generating, prior to the welding operation, a first signal upon applying a predetermined amount of clamping force through said electrodes to a plurality of elements to be disposed between said electrodes and, subsequent to the welding operation, a second signal upon reapplication of said predetermined amount of clamping force to a plurality of elements to be disposed between said electrodes; measuring means for sensing during the welding operation a reduction in thickness of the elements to be disposed between said electrodes and generating a signal proportional thereto; means responsive to said first generated signal for connecting said electrodes to said power supply means for actuating said measuring means; means responsive to said second generated signal for deactivating said measuring means; and means responsive to the signal generated by said measuring means for controlling the welding apparatus.

Accordingly, one of the objects of this invention is to provide an improved apparatus for making resistance welds which accurately and quickly measures the reduction in thickness of the clamped elements being welded together during the welding operation.

Another object of this invention is to provide an apparatus for making resistance welds which includes means for simultaneously applying a predetermined amount of clamping force to a plurality of elements, connecting the elements to a power supply means and actuating a measuring means.

Another object of this invention is to provide an apparatus for making resistance welds including signal generating and clamp force applying means for simultaneously applying a predetermined amount of clamping force through a pair of electrodes to a plurality of elements and connecting said electrodes to a source of power, said means including a light sensitive switch means, and a measuring means including a light sensitive means for sensing the amount of reduction in thickness of the elements during the welding operation and generating a signal proportional thereto.

Another object of this invention is to provide an apparatus for making resistance welds comprising a pair of electrodes, one of which is mounted for relative movement with respect to the other; a power supply means; a signal generating and clamping force applying means, said means including means for generating, prior to the welding operation, a first signal upon applying through said electrodes a predetermined amount of clamping force to a plurality of elements to be disposed between said electrodes; measuring means for sensing during the welding operation a reduction in thickness of the elements to be disposed between said electrodes and generating a signal proportional thereto; means responsive to said first generated signal for connecting said electrodes to said power supply means and for actuating said measuring means; and means responsive to a signal of predetermined value generated by said measuring means for disconnecting said electrodes from said power supply means and for controlling the welding apparatus.

Another object of this invention is to provide an apparatus comprising: a pair of electrodes, one of which is mounted for relative movement with respect to the other; a power supply means; signal generating and clamp force applying means, said means including means for generating, prior to the welding operation, a first signal upon applying a predetermined amount of clamping force through said electrodes to a plurality of elements to be disposed between said electrodes and, subsequent to the welding operation, a second signal upon reapplication of said predetermined amount of clamping force to a plurality of elements to be disposed between said electrodes; measuring means for sensing during the welding operation a reduction in thickness of the elements to be disposed between said electrodes and generating a signal proportional thereto; means responsive to said first generated signal for connecting said electrodes to said power supply means and for actuating said measuring means; means responsive to said second generated signal for deactivating said measuring means; and means responsive to the signal generated by said measuring means for controlling the welding apparatus.

Further objects and features of novelty of the invention will become apparent when referring, for a better understanding of the invention, to the following description taken in conjunction with the accompanying drawings, wherein.

Referring now to the drawings, in FIGURES 1–6 is shown a preferred embodiment of an apparatus constructed in accordance with this invention. The apparatus is a resistance welding device including a weld head 20, a power supply 22, a digital read-out or indicating means 24, and a control card 26. The weld head 20, which is enclosed in a cover 28, includes a pair of electrodes 30 and 32, electrode 30 being mounted stationarily with respect to said weld head 20 while electrode 32 is mounted for relative movement with respect to electrode 30.

Referring now to FIGURES 2–7, within the housing 28 of the weld head 20 is a body 34 to which is adjustably secured an electrode holder 35 and insulated therefrom by suitable means (not shown). Electrode 30 is mounted within an arm 31 mounted in electrode holder 35 formed integrally with member 36 and both electrode 30 and the attached member 36 and body 34 are, for any particular welding schedule, stationarily disposed with respect to each other. Member 36 is secured to the body 34 by any suitable means such as the use of a plurality of screws 38 and washers 40. In the event that it is desirable or necessary to adjust the member 36 with respect to the body 34 prior to beginning a new weld schedule, it will be readily apparent that such adjustments may be easily effected by loosening the screws 38 and sliding the member 36 to the right or to the left. As viewed in FIGURE 2 the member 36 may be positioned a considerable distance to the left upon removing the right hand screws 38 and washers 40 and inserting same in the screw receiving recesses 42 and thence tightening down all the screws 38. The member 36 is attached to an electrical cable 44 through the use of a nut 46 and a wing nut 48 both of which are mounted upon the threaded portion of a screw 50. Electrode 32 is held by an arm 51 mounted in electrode holder 52 which is formed integral with a plate 54. Electrode 32 is connected to an electrical cable 56 which is securely attached to a portion 58 of the body 34 by means of a screw 60 and a nut 62. The electrical cables 44 and 56 are connected to the power supply 22 shown in FIGURE 1.

Figure 1:
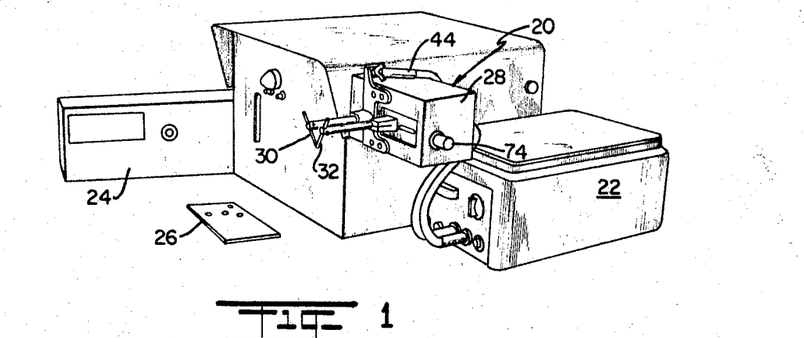
FIGURE 1 is a perspective view of the preferred embodiment of an apparatus constructed in accordance with this invention.
Figure 2:
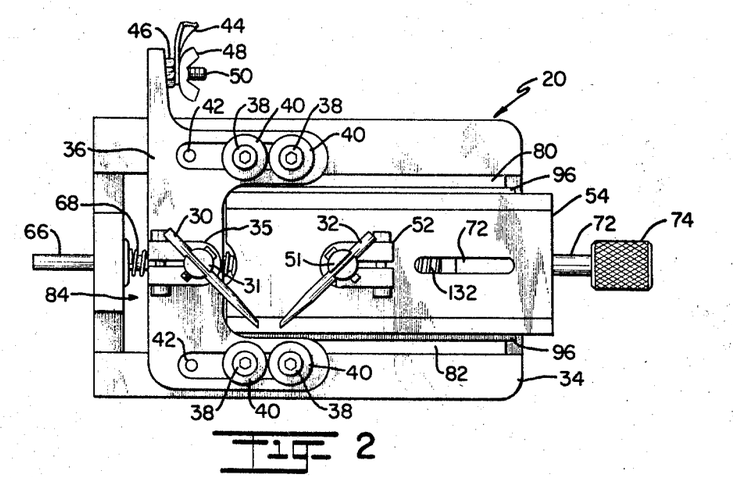
FIGURE 2 is a front elevational view of the weld head shown in FIGURE 1 with the casing removed.
Figure 3:
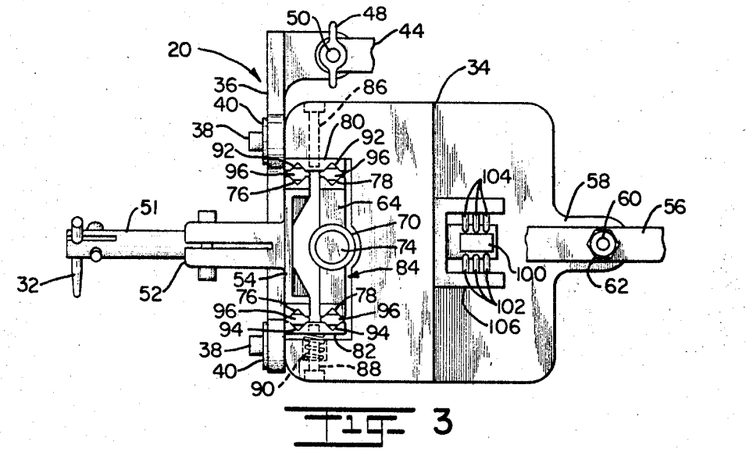
FIGURE 3 is a right end elevational view of the weld head shown in FIGURE 2.
Figure 4:
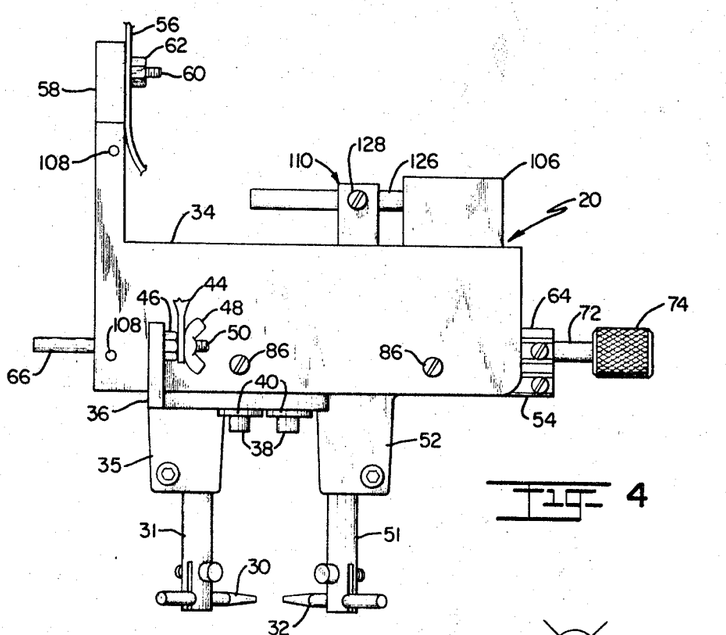
FIGURE 4 is a top plan view of the weld head shown in FIGURE 2.

The weld head 20, as shown in FIGURE 3, also includes a second plate 64 disposed rearwardly of the first plate 54. Plate 64 is attached to a rod or elongated member 66 which extends outwardly from the left side of body 34 as viewed in FIGURES 2 and 4. The plate 64 is biased by spring 68 toward the right end as viewed in FIGURE 2. Plate 64 has an enlarged portion 70 in which member 72, which has an enlarged end portion 74, is threadedly mounted for longitudinal adjustment relative thereto.

Each of the plates 54 and 64 has longitudinally extending grooves 76 and 78 formed on the upper and lower surfaces thereof. The body 34 has a pair of rectangular-shaped members 80 and 82 mounted within the recess portion 84 formed in the front face thereof. The upper, rectangular-shaped member 80 is securely mounted within said recess 84 by a pair of screws 86, see FIGURES 3 and 4. The lower, rectangular-shaped member 82 is positioned within the recess 84 by a pair of screws 88 and biased upwardly by springs 90, see FIGURE 3. Each of the rectangular shaped members 80 and 82 has a pair of longitudinally extending grooves 92 and 94 formed therein. A pair of longitudinally extending friction limiting devices or bearings 96 is disposed between each rectangular-shaped member 80, 82 and a corresponding one of said plates 54, 64.

The weld head 20 also contains a light sensitive switch means 98 including an apertured mask member 100 disposed intermediate one or more sources of light 102 and one or more light sensitive members 104. It will be understood that a single light source and a single light sensitive member will suffice; however, where greater flexibility is required, i.e., to permit the selection of different clamping forces but without changing the setting of member 72 or using a different light sensitive switch means, a plurality of light sources and a plurality of light sensitive members may be incorporated within the light sensitive switch means 98 with each light source-light sensitive member set being positioned differently from the other set or sets. Each source of light 102 and each light sensitive member 104 are mounted, respectively, on opposed arms of a C-shaped member 106 which is firmly attached to plate 64. The mask member 100 is, in turn, securely attached to plate 54. The casing 28 is adapted to be secured to the body 34 through the use of a plurality of screws (not shown) disposed within recesses 108, see FIGURE 4.

Figure 5:
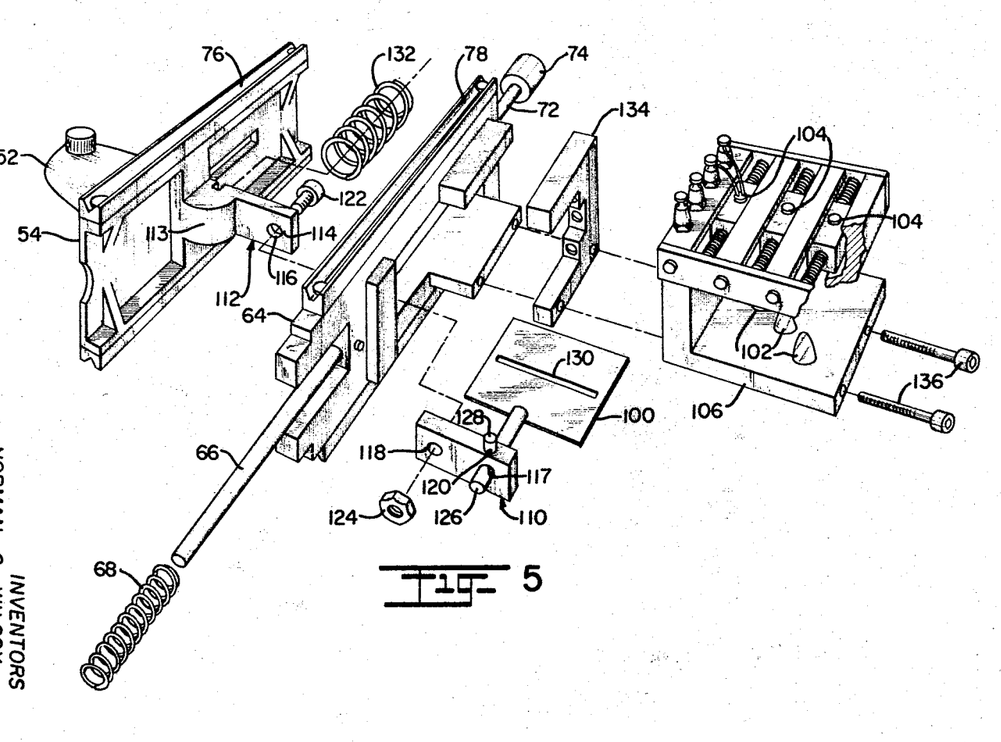
FIGURE 5 is an exploded view in perspective of a portion of the component parts of the weld head.

Referring now to FIGURE 5, a more detailed description of the various components contained within the weld head 20 will now be described. In essence, the component parts shown in FIGURE 5 comprise a pair of assemblies. The first assembly includes plate 54, apertured mask member 100 and a mounting support 110 for securing said mask member 100 to said plate 54. Plate 54 has a flange portion 112 extending outwardly from the rearward face thereof comprising a base portion 113 and an outer portion 114. The outer part 114 of the flange portion 112 has an aperture 116 formed therein. The mounting support 110 has a pair of transversely disposed apertures 117 and 118 formed therein and another aperture 120 which intersects aperture 116 substantially at a right angle. The mounting support 110 is attached to plate 54 by means of a screw 122 and nut 124 disposed within aperture 116 of flange portion 112 and aperture 118 of mounting support 110. The mask member 100 is firmly secured to a rod like member 126 which has one end thereof mounted within aperture 117 of mounting support 110. The rod like member 126 is securely maintained within mounting support 110 by means of an adjustable screw 128. The mask member 100 has a narrow aperture or slot 130 formed therein. Thus, it will be understood that the assembly comprising the plate 54 and mounting support 110 will, upon movement, move as an integral unit.

Figure 6:
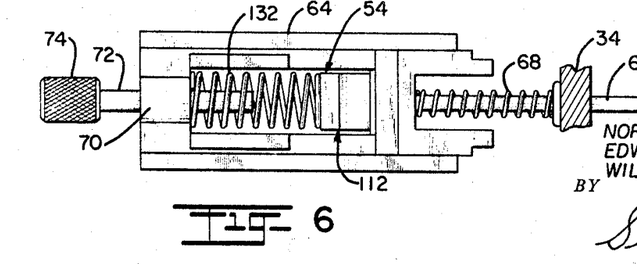
FIGURE 6 is a rear elevational view of plate 64 and a part of plate 54 of the weld head shown in FIGURE 5 depicting the disposition of resilient means or spring 132 with respect to member 72.

The other assembly includes plate 64, spring 68 which is mounted upon the rod member 66 attached to plate 64, a resilient means or spring 132 which is positioned on the end of member 72 as shown in FIGURE 6, a C-shaped spacer member 134, a C-shaped member 106 and screws 136. Thus, it will be readily apparent that the second assembly as described will, upon movement, move as an integral unit.

Figures 8, 9, 11, 12:
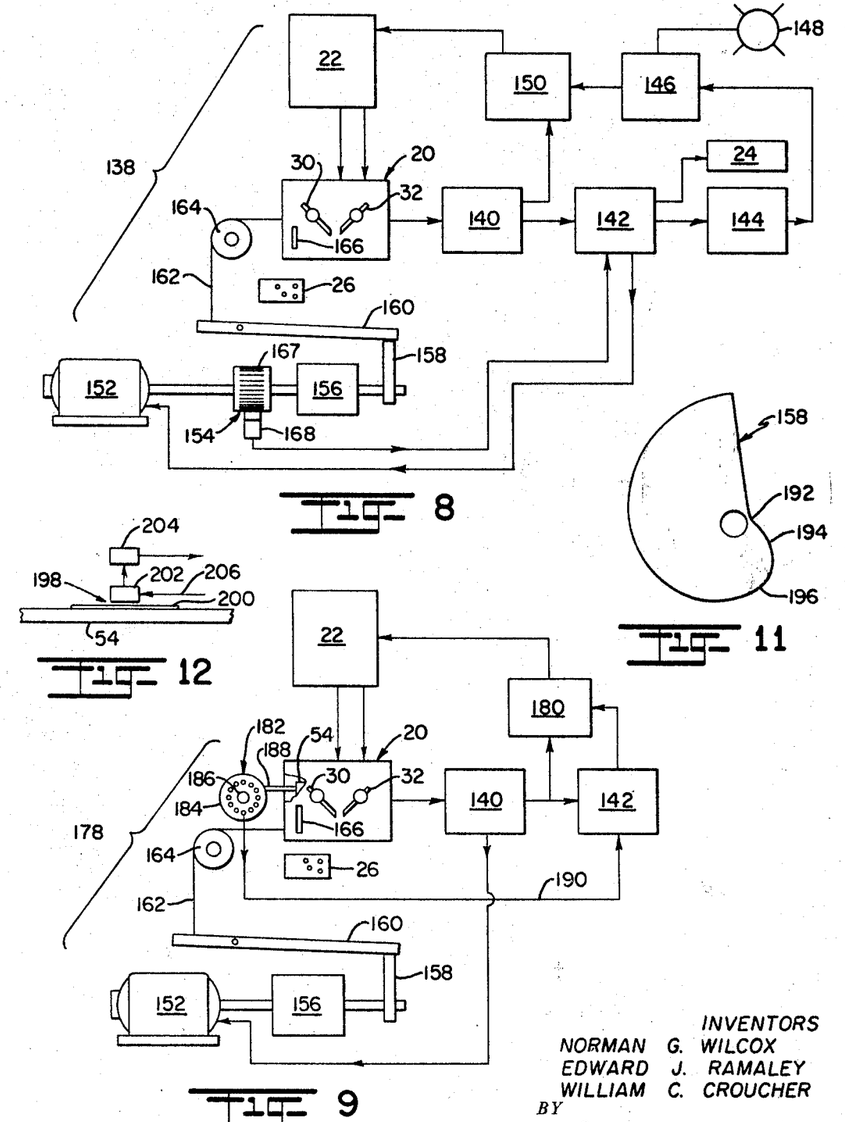
FIGURE 8 is a schematic block diagram of a preferred embodiment of an apparatus constructed in accordance with this invention.
FIGURE 9 is a schematic block diagram of another preferred embodiment of an apparatus constructed in accordance with this invention.
FIGURE 11 is an end elevational view of a cam member useful in an apparatus constructed in accordance with this invention.
FIGURE 12 is a schematic view of a pulse generating means which may be used within the measuring means portion of an apparatus constructed in accordance with this invention.

Referring now to FIGURE 8, a welding apparatus 138 constructed in accordance with the subject invention is shown comprising a weld head 20, a power supply 22, an indicating means 24, a control card 26, an amplifier 140, a counting circuit 142, a comparator circuit 144, a lockout circuit 146, a reject indicating means 148, a firing relay 150, a motor 152, a measuring means 154 including a light sensitive pulse generating means, a gear train 156, a cam 158 (see also FIGURE 11), a rocker arm 160, a cable 162 and a pulley 164. One end of the cable 162 is connected to the rod like member 66 which, as previously indicated, is secured to plate 64.

Figure 7A:
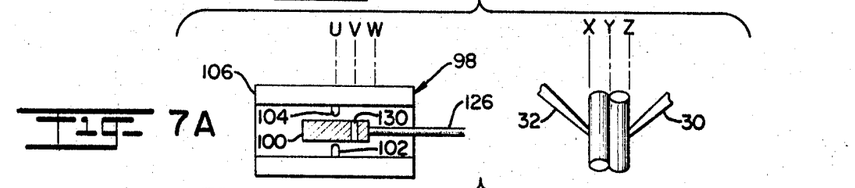
FIGURE 7A is a schematic view taken from the back of the welding head and showing the relative position of the various parts of the light sensitive switch means when the electrodes are disposed in contacting but non-clamping engagement with two elements that are positioned between said electrodes.
Figure 7B:
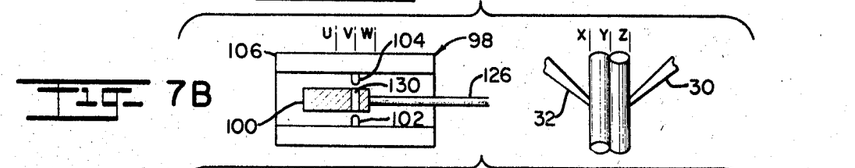
FIGURE 7B shows a relative position of the parts of the light sensitive switch means and the electrodes upon application of a predetermined amount of clamping force to the elements disposed between said electrodes.
Figure 7C:
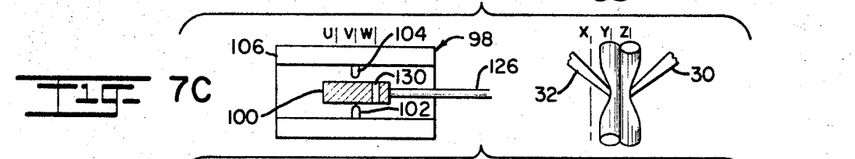
FIGURE 7C shows the relative position of the parts of the light sensitive switch means and the electrodes following application of electrical energy to the parts disposed therebetween.

The operation of the apparatus 138 shown in FIGURE 8 is now described. An information control card 26 is selected in accordance with the requirements of a predetermined weld schedule. In essence, the control card 26 is used to control the amount of power being passed through the electrodes 30 and 32 of the weld head and may be used to predetermine the operation of certain other circuits such as circuits controlling electrode clamping force, weld energy polarity and set down or reduction in thickness limits. With the control card 26 installed within slot 166, a plurality of parts (see FIGURES 7A–D) to be welded together are positioned between the ends of the electrodes 30 and 32. It will be understood that magnetic tape, punch card, microfilm or other information carrying devices may be substituted for the control card 26 if desired. A switch (not shown) is actuated which turns on motor 152. Operation of motor 152 results in rotation of cam 158. In turn, rotation of cam 158 imparts a force through rocker arm 160 which is transmitted through cable 162 and rod like member 66 to the plate 64. Plate 64 and the components attached thereto by means of screws 136 and plate 54 and the parts attached to plate 54 are caused to be moved toward the observer as viewed in FIGURE 5 or toward the left as viewed in FIGURES 2 and 4. Both plates 54 and 64 continue to move together in the aforesaid direction until the electrodes 30 and 32 contact the parts disposed therebetween. At this point, the electrodes and the light sensitive switch means 98 are in the relative position shown in FIGURE 7A. For purposes of simplicity only one light source 102 and only one light sensitive member 104 are shown in FIGURES 7A–D. When the end of electrodes contact the parts to be welded together, no further movement of plate 54 and the attached apertured mask member 100 occurs prior to the actual welding together of the parts disposed between the electrodes. However, the assembly in which plate 64 is disposed continues to move in the direction as aforesaid. Continued movement of plate 64 transmits an increasing force to plate 64 through the spring 132. This results in a clamping force being transmitted to the parts or elements disposed between the ends of the electrodes 30 and 32. Plate 64 and the attached C-shaped member 106 continue to move in the aforesaid direction until a line interconnecting the source of light 102 and the light sensitive member 104 passes through the aperture or slot 130 or the mask member 100. At the time a beam of light travels unobstructed from the source of light 102 through the aperture or slot 130 to the light sensitive member 104, a predetermined amount of clamping force has been applied to the parts disposed between the ends of the electrodes. Further, as a result of using a light sensitive switch means it is possible to apply again and again the exact amount of predetermined clamping force. The latter is important since the use of an accurate and repeatbale predetermined clamping force is important to the measurement of the linear displacement of the electrodes 30 and 32 resulting from the set down of the welded elements. When the predetermined amount of clamping force has been applied to the elements disposed between the electrodes, the electrodes and the parts of the light sensitive switch means 98 are positioned as shown in FIGURE 7B. When light energy impinges upon the light sensitive member 104, a signal is generated which upon being amplified in amplifier 140 passes simultaneously to the counting circuit 142 and to the power supply 22 through the firing relay 150 thereby actuating both. Upon actuation of firing relay 150, a predetermined amount of energy is supplied from the power source 22 through the electrodes 30 and 32 to the parts being welded together. Upon application of such energy to the parts being welded together, said clamped parts undergo localized heating and fusion and thus experience a reduction in overall thickness as compared to the thickness thereof prior to the application of such energy. As a consequence, there is a momentary reduction in the amount of clamping force being applied to such parts resulting in the assembly comprising plate 54 and the apertured mask member 100 moving in a direction toward the end of the other electrode 30. The force causing such movement of the plate 54 and the apertured mask 100 is derived from the force of the compressed resilient means or spring 132 which has one end thereof seated against the flanged portion 112. At such time, the electrodes and the parts of the light sensitive switch means 98 are positioned as shown in FIGURE 7C, i.e., such parts are no longer in alignment as they were at the time as shown in FIGURE 7B. The importance of utilizing a light sensitive switch means will be further appreciated when it is realized that the respective parts of the switch means move only a few ten thousandth of an inch from the first switching function to the second switching function and yet the accuracy of the respective switching functions at the respective positions is very precise.

Figure 7D:
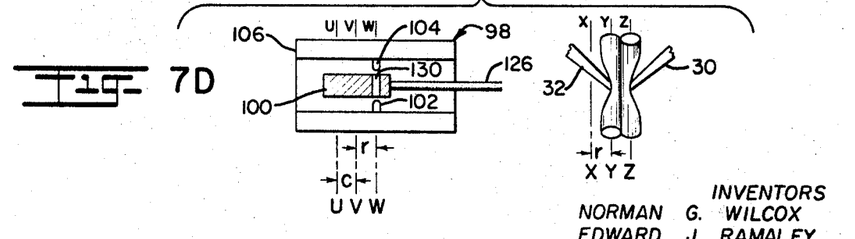
FIGURE 7D shows the relative position of the parts of the light sensitive switch means and the electrodes upon restoration of a predetermined amount of clamping force following the welding operation.

As previously indicated, a signal generated as a result of the aperture 130 of mask member 100 becoming disposed on a line interconnecting the source of light 102 and the light sensitive member 104 as shown in FIGURE 7B, results also in the actuation of the counting circuit 142. Actuation of the counting circuit 142 permits a plurality of pulses or signals being generated by the light sensitive means of the measuring means 154 to be transmitted and sensed within the counting circuit 142. The pulses or signals generated by the measuring means 154, which includes an apertured annular member 167 which has a portion thereof disposed between a light source (not shown) and a light sensitive member 168, are sensed within the counting circuit until the assembly comprising plate 54 and the apertured mask member 100 has moved a sufficient distance in a direction toward the end of the other electrode 30 to reapply the same amount of clamping force as was originally applied prior to the beginning of the welding operation. At such time, the electrodes and the parts of the light sensitive switch means 98 are positioned as shown in FIGURE 7D. At this time, a second signal is generated by the light sensitive switch means 98 which upon being amplified in amplifier 140 is then transmitted to the counting circuit 142 and thereby actuates a circuit which results in the signals being generated by the commutator 154 no longer being received or sensed by the counting circuit 142. Upon this particular actuation of the counting circuit 142, signals are simultaneously transmitted to the motor 152 thereby shutting off same or preferably reversing same after a slight time delay such as about two seconds, to the comparator circuit 144 and to the indicating means 24. The indicating means 24 shows the amount of reduction in thickness which the parts that are now welded together underwent during the welding operation. The comparator circuit 144 compares a signal representative of the amount of reduction in thickness of the welded parts with a predetermined standard to determine whether or not the actual reduction in thickness of the welded parts falls within the minimum and maximum permissible limits of the established standard. If the actual reduction in thickness of the welding parts is either less or more than the established standard, a signal is generated by the comparator circuit 144 and transmitted to the lockout circuit 146. Actuation of the lockout circuit 146 results in actuation of the reject indicator 148 and positioning of the firing relay 150 such that the firing relay 150 remains in the off or non-conducting position until reset in a special manner. Thus, it will be readily appreciated that with the apparatus 138 shown in FIGURE 8, which utilizes the signal generating and clamp force applying means comprising light sensitive switch means 98 and motor 152 and which also includes the measuring means 154, permits the fabrication of an article having good product integrity since all the welds therein are of a known quality.

Referring now to FIGURES 7A-7D, it will be noted that the position of electrode 30 is unchanged throughout the entire operation. As shown, the end of electrode 30 lies in plane Z—Z. However, the end of electrode 32 moves during the welding operation from plane X—X to plane Y—Y. The distance designated by the letter $r$ represents the amount of reduction in thickness occurring during the welding operation. Depending on the weld schedule, $r$ may vary from as little as 0.0007" up to about 0.0150". Since the aperture or slot 130 of the mask member 100 moves similarly as the end of electrode 32, it will likewise be noted that the aperture 130 will move from plane V—V to plane W—W during the welding operation. Again, the distance represented by the letter $r$ indicates the amount of reduction in thickness that the parts undergo during the welding operation. It is to be noted that the light source 102 and the light sensitive member 104 move from plane U—U to plane V—V during the initial application of a predetermined amount of clamping force by a distance which is represented by the letter $c$. During the welding operation, the light source 102 and the light sensitive member 104 move from the plane V—V to W—W by an amount $r$ which equals the reduction in thickness which occurs during the welding operation.

Figure 10:
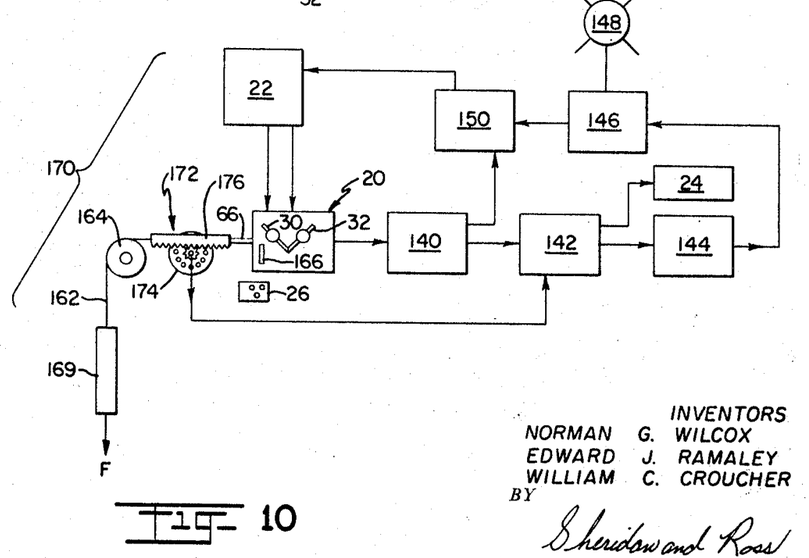
FIGURE 10 is a schematic block diagram of yet another preferred embodiment of an apparatus constructed in accordance with this invention.

In FIGURE 10 is shown another apparatus 170 constructed in accordnace with the subject invention. For purposes of simplicity, the component parts of apparatus 170 which are similar to those parts described above in connection with the apparatus 138 of FIGURE 8 are identified with the same number. More specifically, apparatus 170 as shown in FIGURE 10 includes a weld head 20, a control card 26, an amplifier 140, a counting circuit 142, a comparator circuit 144, a lockout circuit 146, a reject indicator 148, a firing relay 150, a cable 162, means 169 for limiting the maximum velocity at which cable 162 may be driven by an applied driving force such as force F, a pulley 164, and a measuring means 172 comprising a light sensitive pulse generating means including an apertured disk 174 which is rotated by a translatably mounted rack 176. Rack 176 is connected to the rod like member 66.

The operation of apparatus 170 of FIGURE 10 is very similar to the operation of apparatus 138 shown in FIGURE 8. The principal difference between apparatus 170 of FIGURE 10 and apparatus 138 of FIGURE 8 results from the use of the pulse generating means 172 in lieu of the pulse generating means of the measuring means 154 shown in FIGURE 9 and the manner in applying a driving force. It will be noted that the light sensitive means 172 has a translatably mounted rack 176 connected at one end of the cable 162 and at the other end to the free end of member 66. Thus, linear movement of the rack 176 results in rotary movement of apertured disk 174. Means 169 for limiting the maximum velocity at which cable 162 may be driven prevents the application of an excessive amount of force against the elements to be disposed between the electrodes and this precludes or greatly minimizes the chance of damage occurring to the welding apparatus as well as the elements to be welded together. It will be understood that the force F may be applied in any suitable manner such as by the actuation of a foot operated pedal.

Another embodiment of an apparatus constructed in accordance with the subject invention is apparatus 178 shown in FIGURE 9. For purposes of simplicity and clarity, those parts of apparatus 178 which are similar to the component parts utilized in the apparatus 138 of FIGURE 8 are identified with the same number. More specifically, apparatus 178 comprises a weld head 20, a power supply 22, a control card 26, an amplifier 140, a counting circuit 142, a switch means 180, a motor 152, a gear train 156, a cam 158, a rocker arm 160, a cable 162, a pulley 164, and a measuring means including a modified micrometer means 182. The operation of apparatus 178 differs generally from the operation of apparatuses 138 and 170 in that the motor is shut off and secured in place simultaneously with the actuation of the counting circuit 142 and the turning on of the power supply 22. It is to be noted that micrometer means 182 includes a light sensitive means comprising an apertured disk 184 mounted for rotation upon a shaft 186, which is stationarily mounted, and a member 188 which is connected to and moves with plate 54.

The operation of apparatus 178 is now described. A switch (not shown) is actuated resulting in the turning on of motor 152. Operation of motor 152 results in a force being applied through the gear train 156, cam 158, rocker arm 160, cable 162 and rod like member 66 (see FIGURE 5) to cause both plates 54 and 64 to move toward the end of electrode 30. When the end of electrode 32 contacts a portion of the parts disposed between electrodes 30 and 32, further movement of electrode 32, plate 54 and the apertured mask member 100 is precluded until actual welding occurs. However, plate 64 and the parts attached thereto continue to move in the same direction thereby compressing the resilient means or spring 132.

Plate 64 continues to move until a predetermined amount of clamping force has been applied to the parts disposed between the ends of the electrodes 30 and 32. At the exact time such predetermined amount of clamping force has been so applied, the aperture 130 of the mask member 100 is coaligned with a line connecting one of the light sources 102 with one of the photosensitive members 104. On such coalignment, a signal is generated by the light sensitive switch means 98 which upon being amplified by amplifier 140 shuts off the motor 152 whereby same is held in place. Immediately thereafter, switch means 180 and the counting circuit 142 are actuated resulting in power being supplied on a continuous basis from the power supply 22 to the electrodes 30 and 32 and signals or pulses which are being generated by the modified micrometer means 182 being received and sensed in the counting circuit 142 via line 190. When a predetermined number of signals has been generated by the micrometer means 182, following actuation of the counting circuit 142, to indicate that a weld of acceptable quality has been effected, the number of such signals being representative of the amount of reduction of thickness of the elements being welded together, a signal which is generated by the counting circuit 142 is transmitted to the switch 180. Upon transmission of this particular signal, the power supply 22 is shut off. It will be understood that there will be a slight reduction in the amount of applied clamping force during the welding operation in apparatus 178 of FIGURE 9 since the motor was shut off and secured in place immediately prior to the application of electrical energy to the elements to be welded together. However, the amount of reduction is very slight, amounting to only one or two ounces. Since the amount of applied clamping force is in the range of 5–15 pounds and preferably about 10–12 pounds, it has been found that the reduction of only one or two ounces has no appreciable effect on the quality of a weld made with an apparatus constructed in accordance with this invention. It will be appreciated, however, that the amount of clamping force as initially applied to each set of elements prior to the welding operation will be the same in each case. This requirement is, as previously indicated, important in achieving uniform but high quality characteristics for each weld made with an apparatus constructed and used as described herein.

It has been found that the apparatus 178 need not use a cam having as nearly an exacting tolerance as is generally the case for the cam used in apparatus 138.

It will also be understood that the motor 152 should not be shut off prior to the application of energy to the parts to be welded together where the energy is supplied on other than a continuous basis, for example such as is the case where capacity-stored energy is utilized.

In FIGURE 11 is shown an end elevational view of the cam member 158. In the apparatuses shown and disclosed it is contemplated that cam surface portion 192 will be disposed in contacting engagement with the rocker arm 160 prior to the positioning of the elements to be welded together between the electrodes 30 and 32. Then upon actuation of the apparatus, the cam member 158 will rotate in a counter clockwise direction, as viewed in FIGURE 11, thereby bringing cam surface portion 194 in contacting engagement with the rocker arm 160. The radius of the cam surface portion 194 increases rapidly with a small azimuth change in order to decrease the amount of time required to bring the electrodes 30 and 32 in contacting engagement with the elements disposed therebetween. Thereafter, the radius of the cam surface portion 196 increases less rapidly. As a matter of fact, from portion 194 onward past portion 196, the cam surface is preferably formed on a "straight line formation," i.e., each degree of travel of the cam will produce a corresponding amount of movement of the rocker arm. For most welding operations, cam member 158 will rotate approximately one-fourth of a revolution. After the welding operation has been completed, the cam member 158 is reversely rotated back to the normal starting position.

In FIGURE 12 is shown another pulse generating means 198 which may be used with an apparatus as constructed in accordance with the subject invention. The pulse generating means 198 in FIGURE 12 includes a member 200 such as a magnetic tape upon which is stored a plurality of magnetic pulses and a means 202 for sensing movement of magnetically stored pulses and generating signal corresponding thereto. The signal generated by means 202 is transmitted to an amplifying means 204 and thence to a counting circuit (not shown) such as counting circuit 142 in FIGURES 8, 9 and 10. The means 202 is actuated by a signal received in line 206 from a component such as an amplified signal from the light sensitive switch means 98. Means 202 is shown as being stationarily disposed with respect to member 200 which is mounted upon plate 54. It will be appreciated, however, that member 200 could be stationarily disposed and means 202 could be mounted upon plate 54. Thus, the pulse generating means 198 as shown in FIGURE 12 includes a magnetic flux generating and sensing means, a portion of which is mounted for movement proportional to the movement of the movable one of said electrodes. More specifically, the pulse generating means 198 in FIGURE 12 may be described as including a magnetic flux generating and sensing means, said means including a first portion comprising a plurality of magnetically stored pulses and a second portion for sensing the magnetic flux generated by the movement of said first portion relative to said second portion, one of said portions being mounted for movement relative to the other said portion and also for movement proportional to the movement of the movable one of said electrodes. Although reference should be made to U.S. patent application Ser. No. 387,902, filed June 29, 1964, for a more comprehensive understanding of the theory of welding with the apparatuses disclosed herein, a brief outline of the theory is now described. In the normal routine, two or more wires or ribbons are arranged to cross each other at a substantial angle and are placed in a welding zone with the intersection of the elements lying between the electrodes. The electrodes are moved toward each other to bring their points in contact with the assembly and to apply thereto a predetermined pressure. A predetermined potential is then applied across the assembly to pass current therethrough for a predetermined length of time which has been found to be sufficient to produce local melting and flow at the point of contact, resulting in a joining of the elements. Welds made in this general manner are basically very satisfactory and the method described has been widely adopted. So long as the quality of the material is consistent and the amount of pressure and heat applied are kept constant, the welds are quite uniform and satisfactory performance is assured. With respect to the quality of the material, the wire or other weld material can usually be inspected in bulk so that the uniformity of large quantities can be determined easily and quickly.

Experimental work and general experience have shown that the three criteria mentioned above, i.e., clamping pressure, quantity and rate of applying heat energy, and uniformity of the parts to be welded together, almost solely determine the quality and uniformity of the completed welds. For every combination of size and type of wire or other element to be joined, a weld schedule is made up which specifies the pressure applied to the assembly and the quantity of heat energy applied to it. Suitable voltages are selected and time of application specified. The energy is actually considered in terms of watt-seconds and normally the machines are set and continually monitored to keep this value as constant as possible for the series of identical joints which are to be made.

Although the system set forth above would appear to guarantee uniformity over long periods of time, testing of samples has shown that there are variations in quality and strength of weld beyond allowable limits. While the causes are not positively and exactly known it has been determined that one element to be considered is a possible discrepancy between the watt-second output of the welding machine and the actual watt-seconds in the weld itself. This discrepancy can result from any of various causes such as dirt and corrosion at the point of contact, variation in the conductivity of the material, etc. It will be appreciated that even with absolute uniformity of watt-second output of the machine there is always the possibility of variation of the watt-second input of the weld itself. Hence, prior art welding methods and apparatuses required that some kind of testing be carried out regularly. The principal and almost sole manner of testing was that of pulling the weld apart in order to determine the ultimate strength thereof. While such pull strength tests were fairly consistent and gave a fairly good idea of what comparable production parts would do in the way of quality they still had various disadvantages. In addition to the fact such tests are destructive of the welds so tested, since the samples which are tested in this manner are not the welds which will be used there is always a question of just how identical they are.

It has been found, however, that a non-destructive test may be performed on each weld made and that such nondestructive test is highly reliable when certain welding conditions are observed. In essence, the test contemplated involves the measurement of the reduction in thickness of the elements to be welded together during the welding operation. It has been found that the measurement of the thickness or thickness reduction of the weld joint in comparison with measurements of similar joints and with a standard constitute a very accurate method of judging the consistency and quality of production welded joints. Thus, where certain welding conditions are observed, i.e., a predetermined standard of uniformity of the elements to be welded together is maintained and a predetermined clamping force is applied to the elements during the welding operation, resistance welds having an unusual degree of uniform but high quality characteristics are obtained when a predetermined amount of reduction in thickness occurs during the welding operation. The use of apparatuses as described herein permit the production of such welds in accordance with the foregoing criteria.

From the foregoing, it will be understood that several unique and novel apparatuses for welding have been described which permits the welding together of a plurality of parts or elements with a degree of quality heretofore unobtainable and at greatly increased welding rates. For example, one of the apparatuses as described herein may be utilized by supplying a predetermined quantity of energy through the parts to be welded together and then measuring the amount of reduction of thickness to determine whether or not the finished weld is acceptable based on established welding criteria. Additionally, another one of the apparatuses as described herein may be used to weld together a plurality of parts by continuously supplying electrical energy to the parts to be welded together until a predetermined reduction in thickness of such parts occurs as a result thereof. It will also be understood that an apparatus as described herein may be utilized in alternating current resistance welding as well as with direct current resistance welding.

Although the illustrative embodiments of the invention herein set forth have been described in detail to make a full disclosure of the invention, it is to be understood that the particular embodiments described are intended to be illustrative only, and that the various features of the invention may be incorporated in other forms without departing from the spirit and scope of the invention as defined in the subjoined claims.

What we claim is:

1. An apparatus for making resistance welds comprising: a pair of electrodes, one of which is mounted for relative movement with respect to the other; a power supply means; means for generating, a first signal upon application of a predetermined clamping force through said electrodes to a plurality of elements to be disposed between said electrodes and, a second signal upon re-application of said predetermined clamping force to a plurality of elements to be disposed between said electrodes; means for measuring the reduction in thickness of the elements between said electrodes caused by welding and generating a signal proportional thereto; means responsive to said first generated signal for connecting said electrodes to said power supply means and for actuating said measuring means; means responsive to said second generated signal for deactivating said measuring means; and means responsive to the signal generated by said measuring means for controlling the welding apparatus.

2. An apparatus as described in claim 1 in which said means for generating signals includes a light sensitive switch means.

3. An apparatus as described in claim 1 in which said measuring means includes a light sensitive pulse generating means.

4. An apparatus as described in claim 3 in which said pulse generating means includes a portion stationarily disposed and another portion mounted to rotate an extent directly proportional to the movement of the movable one of said electrodes.

5. An apparatus as described in claim 1 in which said power supply means includes means for supplying a predetermined quantity of energy upon each connection thereof to said electrodes.

6. An apparatus as described in claim 1 in which said measuring means includes a magnetic flux generating and sensing means, a portion of which is mounted for movement proportional to the movement of the movable one of said electrodes.

7. An apparatus as described in claim 1 in which said means responsive to the signal generated by said measuring means includes means for indicating the amount of reduction of thickness of the elements to be welded together.

8. An apparatus as described in claim 1 in which said means for generating signals includes a light sensitive switch means and in which said measuring means includes a light sensitive pulse generating means.

9. An apparatus for making resistance welds comprising: a pair of electrodes, one of which is mounted for relative movement with respect to the other; a power supply means; means for generating, prior to the welding operation, a first signal upon application through said electrodes of a predetermined amount of clamping force to a plurality of elements to be disposed between said electrodes; means for measuring the reduction in thickness of the elements between said electrodes and generating a signal proportional thereto; means responsive to said first generated signal for connecting said electrodes to said power supply means and for actuating said measuring means; and means responsive to a signal of predetermined value generated by said measuring means for preventing further operation of the welding apparatus.

10. An apparatus as described in claim 9 in which said measuring means includes a light sensitive pulse generating means.

11. An apparatus as described in claim 10 in which said pulse generating means includes a portion stationarily disposed and another portion mounted to rotate an extent directly proportional to the amount of movement of the movable one of said electrodes.

12. An apparatus as described in claim 9 in which said measuring means includes a magnetic flux generating and sensing means, a portion of which is mounted for movement proportional to the movement of the movable one of said electrodes.

13. An apparatus as described in claim 9 in which said means responsive to the signal generated by said measuring means includes means for indicating the amount of reduction of thickness of the elements to be welded together.

14. An apparatus as described in claim 9 in which said means for generating signals includes a light sensitive switch means and in which said measuring means includes a light sensitive pulse generating means.

15. In a welding apparatus for making resistant welds by applying pressure on relatively movable electrodes which in turn apply a compressive force on the material to be welded disposed between the electrodes and directing electrical power through the electrodes to heat the material to a molten state, the improvement comprising means for measuring the reduction in thickness of the material produced by the welding operation and generating a signal proportional to the measured reduction, means responsive to said signal for indicating the measured reduction and means operable in response to said signal having a magnitude which falls outside of a predetermined signal range for locking the apparatus to prevent further operation of the welding apparatus.

References Cited

UNITED STATES PATENTS

| 2,472,368 | 6/1949 | Cox | 219—86 |
| 2,967,227 | 1/1961 | Mierendorf | 219—108 |

RICHARD M. WOOD, *Primary Examiner.*

P. W. MAY, *Assistant Examiner.*

U.S. Cl. X.R.

219—86, 110